United States Patent [19]
Patterson et al.

[11] Patent Number: 6,163,611
[45] Date of Patent: *Dec. 19, 2000

[54] AUXILIARY COMPONENT CONNECTOR INCLUDING MICROPHONE CHANNEL

[75] Inventors: Gregory S. Patterson, Morrisville, N.C.; Wallace G. Keesee, Rustburg, Va.; Curtis W. Thornton, Cary, N.C.

[73] Assignee: Ericsson Inc., Research Triangle Park, N.C.

[*] Notice: This patent is subject to a terminal disclaimer.

[21] Appl. No.: 09/007,657

[22] Filed: Jan. 15, 1998

Related U.S. Application Data

[63] Continuation of application No. 08/717,803, Sep. 24, 1996, Pat. No. 5,761,299.

[51] Int. Cl.[7] ....................................................... H04M 1/00
[52] U.S. Cl. ............................................. 379/438; 379/433
[58] Field of Search .................................. 379/433, 434, 379/428, 429, 399, 438, 436, 420; 455/575, 90

[56] References Cited

U.S. PATENT DOCUMENTS

| | | | |
|---|---|---|---|
| 3,627,930 | 12/1971 | Tolman | 379/433 |
| 3,969,673 | 7/1976 | Nordlof | 325/390 |
| 4,636,591 | 1/1987 | Kuhfus et al. | 379/433 |
| 4,675,903 | 6/1987 | Gulezian et al. | 379/433 |
| 5,761,299 | 6/1998 | Patterson et al. | 379/433 |

*Primary Examiner*—Jack Chiang
*Attorney, Agent, or Firm*—Nixon & Vanderhye P.C.

[57] ABSTRACT

A system connector for an electronic device such as a cellular phone is integrally molded with a mic cavity for receiving a device microphone. By incorporating the microphone into the system connector, overall device thickness can be reduced, providing a more efficient use of space than the previous use of separate connectors.

6 Claims, 2 Drawing Sheets

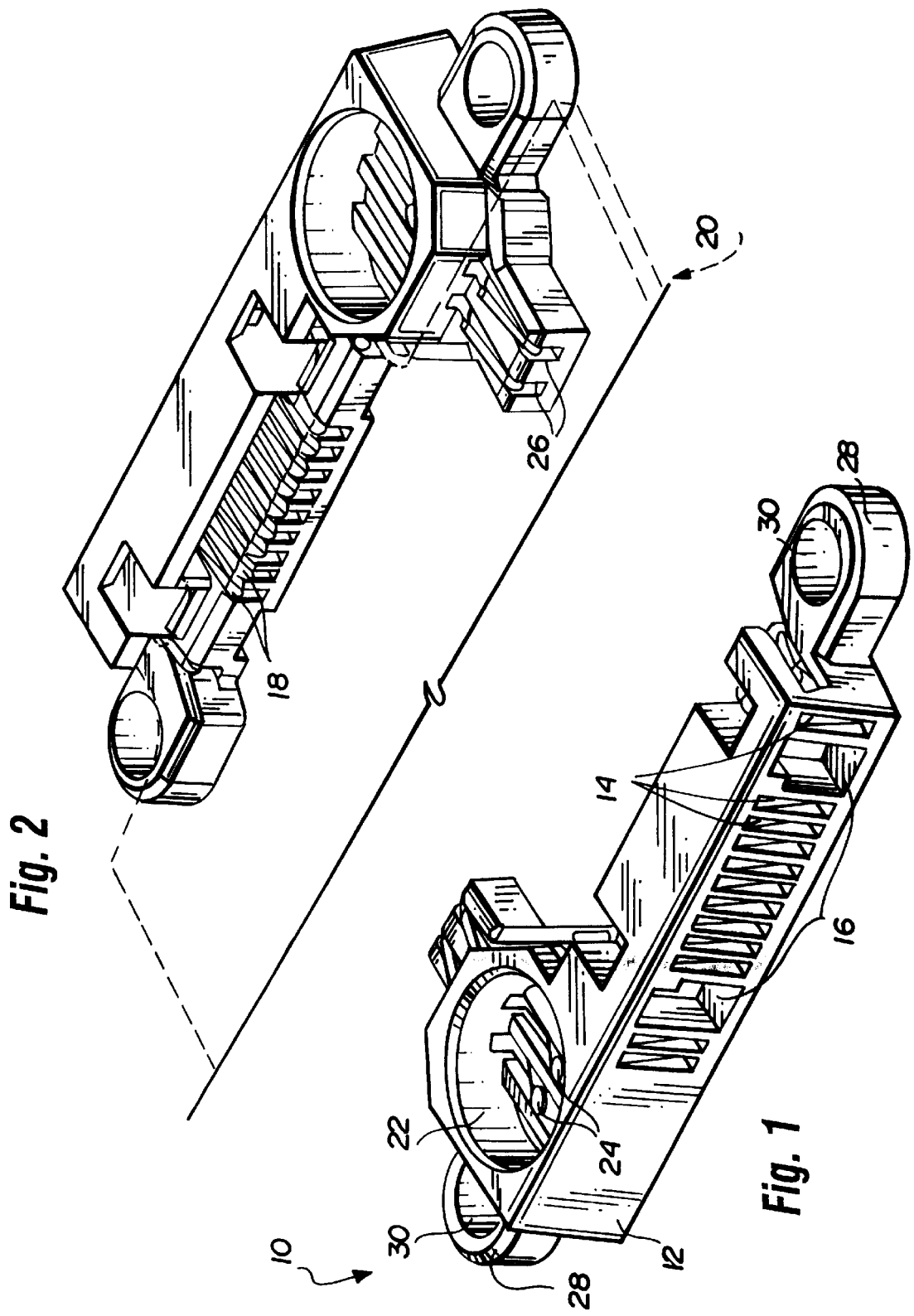

AUXILIARY COMPONENT CONNECTOR INCLUDING MICROPHONE CHANNEL

This is a continuation of application Ser. No. 08/717,803, filed Sep. 24, 1996, U.S. Pat. No. 5,761,299, the contents of which are hereby incorporated by reference.

BACKGROUND OF THE INVENTION

The present invention relates generally to mobile communication devices and, in particular, to a connector for receiving an auxiliary component including an integrally formed mic cavity for receiving a device microphone.

Size is a critical design criteria for electronic devices, such as cellular phones, with the emphasis on a configuration that is very small. However, most components such as the microphone have existing minimum dimensions that must be designed around. Subsequently, these component constraints often drive the mechanical package. New and innovative solutions are needed to optimize the way components are secured into cellular phones while reducing overall package size.

In current cellular phone applications, the microphone is typically contained in the front housing. Contact to the printed circuit board (PCB) can be made, for example, by way of a flex film that is soldered to the microphone or by way of an elastomeric film or connector. In either case, the microphone is positioned entirely above the PCB.

SUMMARY OF THE INVENTION

To reduce the overall phone thickness while providing space for a flip hinge mechanism or the like, it is desired to configure the microphone to be disposed within the thickness of the PCB, rather than sit above the PCB. In support of this goal, the microphone is incorporated into the existing system connector, which acts to secure the microphone with respect to the PCB and housings and which provides a means to make electrical contact from the microphone to the PCB. With existing connectors, gold plated contacts can be worn over time by slight movements of the connector. Spring contacts provide the electrical connection from the microphone to the PCB, although an elastomer could perform the same function. In addition, many non-soldered connectors have a tendency to wear the gold-plated contacts over time by slight movements of the connector. Subsequently, screw boss frames have been incorporated into the microphone/system connector to utilize the phone screw bosses for optimum stability. An additional benefit to this configuration is that a single connector provides a more efficient use of space than having to use two separate connectors (one for the microphone and one for the system connector) or than having to use the phone housing to secure the microphone (adds additional tolerances and wall thickness).

In an exemplary embodiment, in accordance with the present invention there is provided a connector that is connectable to a PCB of an electronic device for receiving an auxiliary component. The connector includes terminal windows shaped to receive a terminal of the auxiliary component, contacts engageable with the PCB, which are disposed in the terminal windows, and a mic cavity shaped to receive a microphone and including contact members disposed therein. The contact members are adapted to connect the microphone to the PCB. At least one attachment ear on the connector may be adapted to be inserted between an upper casing and a lower casing of the electronic device. The attachment ear is preferably shaped to receive a connecting member such as the phone screw boss that connects the upper and lower casings. The connector may further include at least one latching window for receiving a corresponding latching member of the auxiliary component. The contact members may comprise contact springs or an elastomeric film.

In accordance with another exemplary aspect of the invention, there is provided a cellular phone including an upper casing and a lower casing shaped to house phone components including the PCB, and the connector noted above disposed between the upper and lower casings.

BRIEF DESCRIPTION OF THE DRAWINGS

These and other aspects and advantages of the present invention will be described in detail with reference to the accompanying drawings, in which:

FIG. 1 is a perspective view of the connector according to the present invention;

FIG. 2 is a reverse perspective view of the connector illustrated in FIG. 1.

DETAILED DESCRIPTION OF PREFERRED EMBODIMENTS

Figure 3:
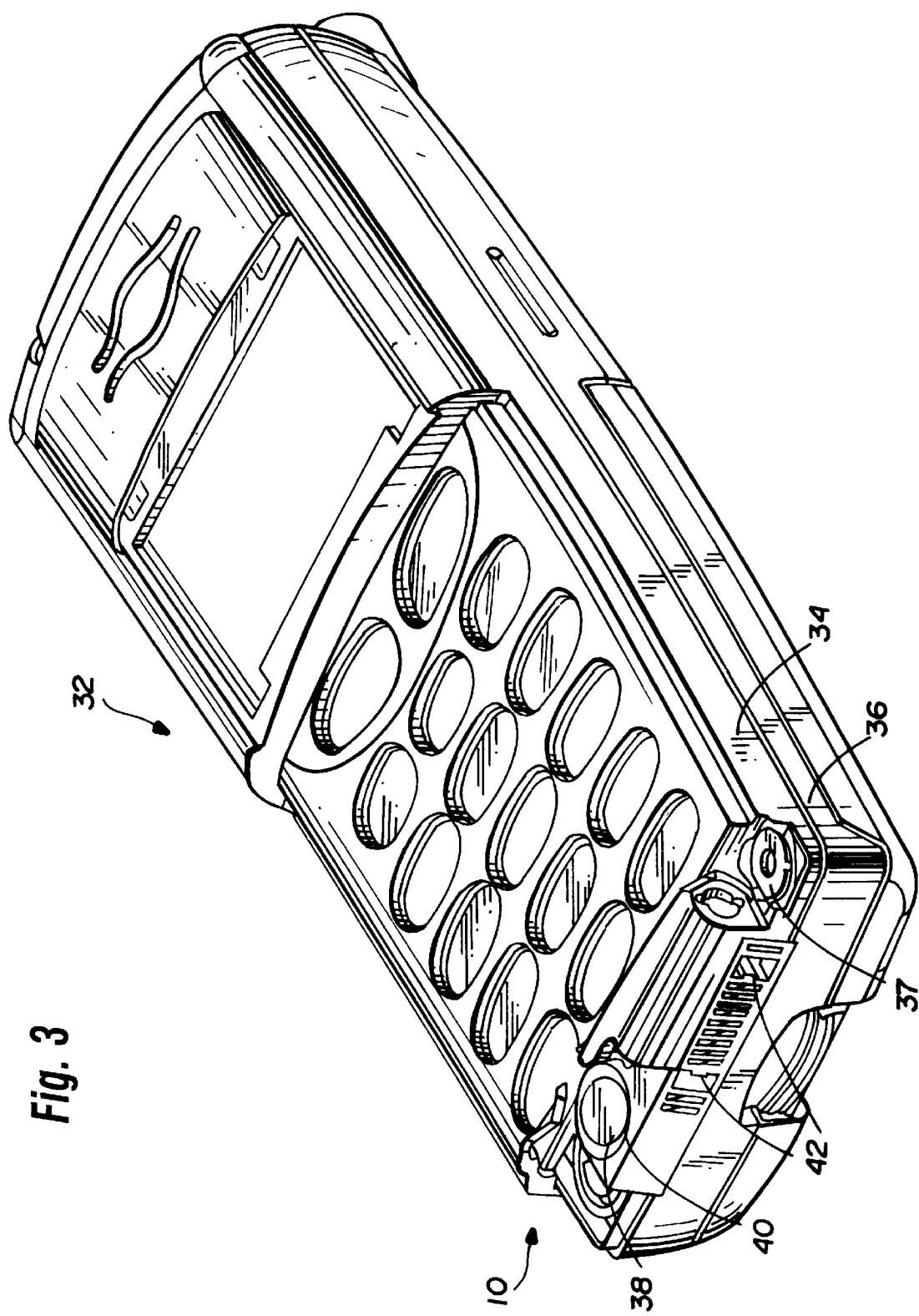
FIG. 3 is a perspective view of a cellular phone incorporating the connector according to the invention.

Although the invention will be described in conjunction with a cellular phone, other applications of the subject matter will be apparent to those of ordinary skill in the art, and the invention is not meant to be so limited.

The connector according to the present invention is preferably formed of a moldable material such as a nylon, liquid crystalline polymer, or eqivalent in a single-step molding process. The molding process is well known, and the details of the process will therefore not be further described.

Referring to FIGS. 1 and 2, the connector 10 according to the present invention includes an exterior face 12 having formed therein one or a plurality of terminal windows 14 and preferably at least a pair of latching windows 16. In other configurations, more or fewer terminal windows and latching windows are provided, and the invention is not meant to be limited to the configuration that is illustrated in the FIGURES. A plurality of PCB contacts 18 are disposed in the terminal windows 14. The contacts 18 are engageable with the cellular phone PCB 20 (shown in phantom in FIG. 2).

At one end of the connector 10 there is provided a mic cavity 22 that is shaped to receive a microphone of the cellular phone. Contact members 24 are disposed in the mic cavity 22 to connect the microphone to the PCB 20. Corresponding PCB contacts 26 are provided on the interior side of the connector 10. Although spring type contacts 24 are shown in the FIGURES, it will be appreciated by those of ordinary skill in the art that an elastomer could be used to perform the same function.

Two attachment ears 28 are formed at opposite ends of the connector 10. The attachment ears 28 include an opening 30 therethrough for receiving phone screw bosses (not shown) to improve stability. In prior connectors, the connection between the connector 10 and the PCB 20 was maintained by the PCB contacts 18 frictionally engaging the PCB 20 and engagement features in the phone housings. Slight movements of the connector during use over many cycles tended to wear the gold plated contacts on the PCB resulting in less effective electrical connections and corrosion.

FIG. 3 illustrates a cellular phone 32 incorporating the connector 10 according to the present invention. As shown in FIG. 3, the connector 10 is sandwiched between an upper casing 34 and a lower casing 36 of the cellular phone. The upper casing 34 and lower casing 36 house the components of the cellular phone including the PCB 20. The phone screw bosses 37 extend through the upper casing, through the apertures 30 in the attachment ears 28 and into the lower casing 36. A microphone 38 is secured in the mic cavity 22 with a rubber grommet 40 or the like.

In operation, the terminal windows 14 receive terminals of an auxiliary component such as a chargers, a headset, data plugs, etc. Typically, the auxiliary components include latching members that cooperate with the latching windows 16 to secure the auxiliary components to the phone. It is possible to provide keying for the auxiliary components, wherein, for example, latches for one component are provided with a different width or the like from another component, thereby preventing the one component from being inserted into an improper location. That is, as shown in FIG. 3, the latching windows 16 may have different widths and/or oppositely disposed projections 42.

By forming the connector integral with a mic cavity for receiving the phone microphone, overall phone thickness is substantially reduced. That is, a cellular phone using a separate connector for the microphone typically has a thickness of about 1.5 mm or more than a phone incorporating the connector according to the present invention. The single connector 10 according to the present invention thus provides a more efficient use of space than separate connectors (i.e., one for the microphone and one for the system connector) or than to use the phone housing to secure the microphone (which adds additional tolerances and wall thickness).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cellular phone comprising:

an upper casing and a lower casing shaped to house phone components including a PCB; and a connector disposed between said upper and lower casings, said connector comprising:
terminal windows shaped to receive terminals of an auxiliary component,
contacts coupled with the PCB, said contacts being disposed in said terminal windows, and
a mic cavity receiving a microphone and including contact members disposed therein, said contact members connecting the microphone to the PCB, wherein said microphone is at least partially disposed within a thickness of said PCB.

2. A cellular phone according to claim 1, further comprising at least one attachment ear disposed between said upper casing and said lower casing, said attachment ear receiving a connecting member that connects said upper and lower casings.

3. A cellular phone according to claim 2, comprising two attachment ears disposed at opposite ends of said connector.

4. A cellular phone according to claim 1, further comprising at least one latching window for receiving a corresponding latching member of the auxiliary component.

5. A cellular phone according to claim 1, wherein said contact members comprise contact springs.

6. A cellular phone according to claim 1, wherein said contact members comprise an elastomeric film.

* * * * *